United States Patent
Goldstein et al.

(12)

(10) Patent No.: US 6,787,594 B1
(45) Date of Patent: Sep. 7, 2004

(54) REDUCED FORMALDEHYDE NONWOVEN BINDERS WHICH CONTAIN POLYMERIZED UNITS OF N-METHYLOLACRYLAMIDE

(75) Inventors: Joel Erwin Goldstein, Allentown, PA (US); Christian Leonard Daniels, Macungie, PA (US); Chung-Ling Mao, Emmaus, PA (US)

(73) Assignee: Air Products Polymers, L.P., Allentown, PA (US)

( * ) Notice: Subject to any disclaimer, the term of this patent is extended or adjusted under 35 U.S.C. 154(b) by 197 days.

(21) Appl. No.: 09/699,723

(22) Filed: Oct. 30, 2000

(51) Int. Cl.$^7$ ............................ C08J 3/03; C08K 5/04
(52) U.S. Cl. .................. 524/457; 524/502; 524/555; 524/747; 524/755; 526/201; 526/214; 526/220; 526/222
(58) Field of Search .................. 524/819, 820, 524/831, 832, 457, 555, 747, 755, 502; 526/173, 180, 181, 201, 202, 214, 222, 220

(56) References Cited

U.S. PATENT DOCUMENTS

| | | | | |
|---|---|---|---|---|
| 3,081,197 A | | 3/1963 | Adelman | 117/140 |
| 3,380,851 A | | 4/1968 | Lindemann et al. | 117/140 |
| 3,912,674 A | * | 10/1975 | Stahl | 260/23 AR |
| 4,044,197 A | * | 8/1977 | Wiest et al. | 526/304 |
| 4,360,632 A | * | 11/1982 | Pinschmidt, Jr. et al. | 524/819 |
| 4,449,978 A | | 5/1984 | Iacoviello | |
| 5,187,233 A | * | 2/1993 | Ball et al. | 525/267 |
| 5,296,532 A | * | 3/1994 | Haerzschel et al. | 524/398 |
| 5,540,987 A | | 7/1996 | Mudge et al. | |
| 6,211,400 B1 | * | 4/2001 | Berghofer et al. | 560/150 |

* cited by examiner

*Primary Examiner*—Judy M. Reddick
(74) *Attorney, Agent, or Firm*—Mary E. Bongiorno

(57) ABSTRACT

The invention is the use of a glycolic acid adduct of sodium sulfite as the reducing agent in the redox couple for polymerization of vinyl acetate polymer based emulsions for nonwoven binders which contain formaldehyde, primarily from the self-crosslinking co-monomer N-methylolacrylamide.

7 Claims, No Drawings

REDUCED FORMALDEHYDE NONWOVEN BINDERS WHICH CONTAIN POLYMERIZED UNITS OF N-METHYLOLACRYLAMIDE

BACKGROUND OF THE INVENTION

Nonwoven webs which are comprised of loosely assembled webs or masses of fibers bound together with an adhesive binder have many applications. These include paper towels, disposable diapers, filtration products, disposable wipes, and the like. Vinyl acetate based emulsions incorporating crosslinkable functionality are widely used in the preparation of these nonwoven products. One of the favorite crosslinking systems is based upon N-methylolacrylamide.

The emission of formaldehyde represents a worker safety and health issue, as well as a consumer issue, and there have been significant attempts to prepare adhesive binders having either reduced formaldehyde content or they are formaldehyde-free. Reduction of formaldehyde in vinyl acetate based emulsions has been achieved by using less favored reducing agents to the formaldehyde sulfoxylates, or by reducing the level of N-methylol acrylamide employed in the adhesive binder. Formaldehyde-free binders eliminate both the N-methylol acrylamide and the use of any formaldehyde emitting reducing agent. However, either method for producing vinyl acetate based emulsion polymers for nonwoven webs has been done so at the expense of performance and cost.

Representative patents disclosing adhesive binders having a post-curable comonomer such as N-methylolacrylamide are as follows:

U.S. Pat. No. 3,081,197 discloses a nonwoven binder incorporating an internal plasticizer and a post-curable comonomer such as N-methylolacrylamide.

U.S. Pat. No. 3,380,851 discloses a binder comprising an interpolymer of vinyl acetate/ethylene/N-methylolacrylamide for the preparation of nonwoven goods.

U.S. Pat. No. 4,449,978 discloses vinyl acetate/ethylene/ N-methylolacrylamide/acrylamide systems for producing nonwoven webs. The advantage of using the N-methylolacrylamide/acrylamide blend has been the ability to reduce the amount of formaldehyde present in the emulsion and in the cured web without a substantial loss of performance.

U.S. Pat. No. 5,540,987 discloses vinyl acetate/ethylene/ N-methylolacrylamide polymers for use in producing nonwoven webs having reduced formaldehyde content as well as reduced formaldehyde content in the cured web. Reduced formaldehyde content is achieved by using a redox system based upon a hydrophobic hydroperoxide and ascorbic acid. These systems result in formaldehyde contents significantly lower than those systems produced using a corresponding reducing agent incorporating no formaldehyde such as sodium metabisulfite or formaldehyde emitting reducing agents such as sodium formaldehyde sulfoxylate.

Several of the approaches to reduced formaldehyde content in nonwoven webs have been directed to actually prepare formaldehyde free nonwoven binders. The approaches pursued for the former include the use of crosslinkers based upon acrylamidobutyraldehyde dialkyl acetal, the methacrylamide derivative, the cyclized version, methyl acrylamidoglycolate methyl ether, allyl glycidyl ether, 3-chloro-2-hydroxypropyl (meth)acrylate and acrylamidoglycolic acid. The problems with these kinds of crosslinkers for nonwoven binders included poorer performance (lower tensile development), activation of the crosslinking chemistry at a pH which is corrosive to the commercial machinery, the requirement to use a more expensive and commercially unavailable novel self-crosslinking monomer and the instability of the self-crosslinking monomer.

BRIEF SUMMARY OF THE INVENTION

The invention relates to improved vinyl acetate based emulsion polymers incorporating N-methylolacrylamide as a crosslinking component for construction of nonwoven webs. The emulsions polymers are prepared by emulsion polymerization of vinyl acetate, N-methylolacrylamide and optional monomers in the presence of a stabilizing system and a redox catalyst system comprised of an oxidizing agent and a reducing agent. The improvement for achieving reduced formaldehyde in the emulsion polymer resides in the use of a glycolic acid adduct of sodium sulfite (a proprietary reducing agent sold under the trademark Bruggolite FF-6) as the reducing agent. Lower formaldehyde levels are achieved in contrast to other formaldehyde free reducing agents such as sodium erythorbate and sodium ascorbate, and to sodium formaldehyde sulfoxylate, or any of the other reducing agents typically used in the preparation of a nonwoven binder employing N-methylolacrylamide as the self-crosslinking monomer.

There are significant advantages associated with the use of the glycolic acid adduct of sodium sulfite in producing vinyl acetate based emulsion binders containing N-methylolacrylamide. They include:

an ability to generate vinyl acetate-based emulsions which are highly suited for use in preparing nonwoven products having substantially reduced formaldehyde levels in the emulsion or latex; and, an ability to generate nonwoven products having excellent resistance to solvents and water while at the same time having excellent adhesion to the fibers for providing enhanced tensile strength.

DETAILED DESCRIPTION OF THE INVENTION

The N-methylolacrylamide containing emulsions for use in producing the nonwoven webs are based on copolymers of vinyl acetate and N-methylolacrylamide. Typically, these are vinyl acetate/ethylene/ N-methylolacrylamide containing polymers, although optionally other monomers may be included in the polymer system as desired. The ethylene content will range broadly from about 10 to 40% and preferably 15 to 30% by weight, yielding an adhesive having a Tg of from −15 to 10° C. Other monomers which may be included in the adhesive binder include vinyl esters of aliphatic carboxylic acids as well as $C_1$–$C_8$ alkyl acrylates and methyacrylates. Examples include methylacrylate, methyl methacrylate, ethyl acrylate, butyl acrylate, and 2-ethylhexylacrylate. Small amounts of polyolefinically-unsaturated monomers, e.g., dioctyl and dibutyl maleate, and the like may also be used.

Commercially, N-methylolacrylamide used in the preparation of vinyl acetate-based nonwoven binders is obtained with about a 48% aqueous solution with up to about 2% acrylamide. Another type of N-methylolacrylamide product which may be used herein is an N-methylolacrylamidelacrylamide mixture. Often this blend is present in a 1:1 molar ratio. Isobutoxy methyl acrylamide is an optional crosslinker but is not preferred to N-methylolacrylamide.

Monomers other than vinyl acetate and ethylene are polymerized in amounts of less than 10% by weight and generally even less than 5% by weight. These levels are exclusive of the level of N-methylolacrylamide or of the level of N-methylolacrylamide blend used in preparing the emulsion polymer. The crosslinking monomer N-methylolacrylamide is generally incorporated at levels of from 0.5 to 10% by weight, although typically levels are from about 1.5 to 5% by weight of the polymer.

Stabilizing systems used for preparing the vinyl acetate based polymers include nonionic emulsifiers such as polyoxyethylene condensates of the formula R—$(CH_2CH_2O)_n$—H wherein R is the residue of fatty alcohol containing 10 to 18 carbon atoms, an alkyl phenol, a fatty acid containing 10 to 18 carbon atoms, an amide or amine, and the like. Examples of polyethoxylated condensates are based on ethoxylated tridecyl alcohol, fatty alcohols, i.e., lauryl alcohol, octyl phenol, nonyl phenol or a secondary alcohol. Furthermore, the stabilizing package may include sodium vinyl sulfonate, sodium dodecyl benzene sulfonate, dioctyl sulfosuccinate, disodium lauryl sulfosuccinate, sodium lauryl sulfate, sodium methyl 2-sulfolaurate and the sodium or ammonium salts of the sulfonates or phosphates of any of the above described nonionic surfactants. Often combinations of emulsifying agents are used; e.g., a relatively hydrophobic emulsifying agent used in combination with the relatively hydrophilic agent.

The amount of active surfactants in the stabilizing system based upon total monomers typically ranges from 1.5% to 6.0%, preferably from 2.5%–4.0% by weight. The ratio between the individual components in the surfactant stabilizing package is one of design.

One of the keys to producing the emulsion polymers having reduced free formaldehyde in the latex as well as in the dried cured web is in the initiator system used to effect polymerization of the monomers. The initiator system employed herein is a redox system based upon an oxidizing agent and a particular class of reducing agents. A wide variety of oxidizing agents may be used. Preferably, these oxidizing agents are inorganic and hydrophobic peroxides, such as hydrogen peroxide, t-butylhydroperoxide and benzoyl peroxide. Thermal initiators such as the persulfates, e.g., ammonium and potassium persulfate, may be used.

Although nonformaldehyde-containing reducing agents, e.g., sodium metabisulfite and ascorbic acid or alkali metal salt thereof have been used in the past in combination with an oxidizing agent, it has been found that a class of sulfinic acid derivatives and particularly the glycolic acid adduct of sodium sulfite affords an exceptional reduction in free formaldehyde content in the emulsions as compared to the other nonformaldehyde emitting reducing agents.

The sulfinic acid derivatives are represented by the formula:

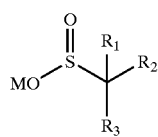

where M is a hydrogen atom an ammonium atom or a monovalent metal ion, e.g., sodium, potassium or an equivalent of a divalent metal, e.g., zinc; $R_1$ is OH or $NR_4R_5$ wherein $R_4$ and $R_5$ each are H or $C_1$–$C_6$ alkyl; $R_2$ is H or an alkyl, alkenyl, cycloalkyl or aryl and the like, and $R_3$ is $CO_2M$. The preferred reducing agent is formed by reacting sodium dithionite with glycolic acid. Other examples of sulfinic acid compounds include 2-hydroxyphenyl hydroxymethyl sulfinic acid-sodium salt; 4-methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionatic acid-disodium salt: ethyl 2-hydroxy-2-sulfinato propionate-sodium salt, and the like.

This class of reducing agents is the only one that seems to offer these significant reductions in vinyl acetate-based adhesives for use in preparing nonwoven products utilizing N-methylolacrylamide as the crosslinking monomer. Preferred results are obtained with the glycolic acid adduct of sodium sulfite which is sold under the trademark Bruggolite FF-6.

The initiator system comprised of an oxidizing and reducing agent is employed in an amount of from about 0.1 to 2% by weight of the total monomers utilized in the polymerization process. The molar ratio of oxidizing agent to reducing agent typically is greater than 1. Conventionally the molar amount of the reducing agent used is less than the molar amount of the oxidizing agent.

Temperatures for effecting polymerization range from about 25 to 85° C. with typical polymerizations being operated in the range of from 55 to 70° C. Reactor pressures range from about 300 to 1200 psig and are dependent upon the level of ethylene that is desired to be incorporated into the polymer.

The manufacture of nonwoven webs is well known, and exemplary processes are noted in U.S. Pat. No. 4,449,978 which is incorporated by reference. Conventionally a mass of fibers are deposited or arranged on a web by an air-laid, etc., technique and then contacted with an aqueous polymeric binder in amounts sufficient to provide about 10 to 100%, by weight of the emulsion polymer, on a dry basis, based on the weight of the starting web. The water is removed and the polymer crosslinked through its self-crosslinking mechanism by use of an acid catalyst. Drying temperatures typically range from 150 to 200° F. for about 4 to 6 minutes followed by a cure of 300 to 310° F. for 3 to 5 minutes.

A wide variety of fibrous materials may be used for preparing nonwoven webs, including cellulosic fibers, polyester, polyolefin, polyurethane, etc. Cellulose is one of the more common fibrous materials which is used for producing paper nonwovens such as disposable diapers, consumer towels, disposable wipes, and filtration products.

The following examples are provided to illustrate various embodiments of the invention and are not intended to restrict the scope thereof.

EXAMPLE 1

Polymerization of Vinyl acetate/Ethylene/N-methylolacrylamide Binder Using Glycolic Acid Adduct of Sodium Sulfite Reducing Agent The polymerization of various vinyl acetate-ethylene/N-methylolacrylamide systems was carried out in a one gallon stirred, stainless steel reaction vessel equipped with a jacket. The reaction vessel was charged initially with 800.0 g of deionized water, 305.0 g of sodium octylphenol ethoxylate sulfate, 3EO (sold under the trademark Polystep C-OP3S), 0.91 g of sodium citrate, 2.4 g of 50% aqueous citric acid, 2.3 g of 5% aqueous ferric ammonium sulfate and 1558.0 g of vinyl acetate. While stirring, 240.0 g of ethylene was introduced below the surface of the liquid in the reaction vessel in order that the interpolymers would have a vinyl acetate:ethylene weight ratio of about 80:20. The reaction vessel was heated to 50° C.

The following three aqueous solutions were intermittently added to the reaction vessel over the course of the reaction (on a delay basis); (a) 7.5% Bruggolite FF-6, (b) 3.0% t-butylhydroperoxide and (c) 291.6 g of a 48% aqueous solution of functional monomers (a commercially available material comprised of approximately 28% aqueous NMA and 20% aqueous acrylamide). After four hours the N-methylolacrylamide/acrylamide (MAMD) delay was complete and the other two delays continued for another 30 minutes. The reaction was terminated by cooling.

The resulting dispersion contained 51.5% solids, a pH of 5.3, and a Brookfield viscosity of 182 cps at 60 rpm and a #3 spindle. The glass transition temperature, $T_g$, of the polymer was 8.9° C. The grit level of the dispersion was 156 ppm on a 100 mesh screen and 25 ppm on a 325 mesh screen.

EXAMPLE 2

Comparison of Vinyl Acetate/Ethylene/N-methylolacrylamide Binders Using Glycolic Acid Adduct of Sodium Sulfite Reducing Agent and Ascorbic Acid Three comparative vinyl acetate/ethylene/self-crosslinking monomer dispersions were prepared where the only significant differences to the Example 1 formulation was in the amount of the reducing agent used in the redox couple and in the amount of ethylene in the resultant polymer.

The first vinyl acetate/ethylene/N-methylolacrylamide emulsions polymers were low $T_g$ dispersions, −14° C. The dispersion formed with the Bruggolite FF-6 based system gave a formaldehyde level of 3.3 ppm while the sodium erythorbate based system gave a formaldehyde level of 27.2 ppm.

The second vinyl acetate/ethylene/N-methylolacrylamide emulsion polymers were high $T_g$ dispersions, 10° C. The Bruggolite FF-6 based systems gave a formaldehyde level of 8.6 ppm while the sodium erythorbate based systems gave a formaldehyde level of 57.1 ppm.

The third second vinyl acetate/ethylene/N-methylolacrylamide emulsion polymers were medium $T_g$ dispersions, 0° C, but the level of self-crosslinking monomer was 50% higher than either of the other two examples. The Bruggolite FF6 based system gave a formaldehyde level of 6.8 ppm while the sodium erythorbate based system gave a formaldehyde level of 47.5 ppm.

In summary, these data show that not only does the Bruggolite FF6 reducing agent based the presumed glycolic acid adduct of sodium sulfite provide excellent results in terms of polymerization rates but is also more effective in reducing the free formaldehyde in the emulsion than other formaldehyde free reducing agent, ascorbic acid. Lower free formaldehyde content in the emulsion may also result in al lower level of free formaldehyde level in the final dried and cured nonwoven web. Further, the tensile properties and absorbencies of the webs produced using the Bruggolite FF-6 reducing agent are indistinguishable one using the ascorbic acid as the reducing agent, all other parameters remaining the same.

What is claimed is:

1. In a vinyl acetate based polymer emulsion formed by the emulsion polymerization of vinyl acetate and N-methylolacrylamide, optionally other monomers, in the presence of a stabilizing system and a redox catalyst system comprised of an oxidizing agent and a reducing agent, the improvement for reducing formaldehyde emissions in the resulting vinyl acetate based polymer emulsion, which comprises:

forming said vinyl acetate based polymer emulsion utilizing as the reducing component of the redox catalyst system a reducing agent of the formula:

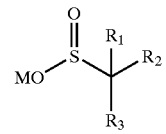

where M is a hydrogen atom, an ammonium atom a monovalent metal ion or an equivalent of a divalent metal ion, $R_1$ is OH or $NR_4R_5$ wherein $R_4$ and $R_5$ each are H or $C_1$–Calkyl; $R_2$ is H or an alkyl, alkenyl, cycloalkyl or aryl and $R_3$ is $CO_2M$.

2. The vinyl acetate based polymer emulsion of claim 1 in which the vinyl acetate based polymer comprises polymerized units of ethylene in an amount of from about 10 to 40% by weight of the polymer.

3. The vinyl acetate based polymer emulsion of claim 2 wherein the N-methylolacrylamide is present in an amount of from about 0.5 to 10% by weight of the polymer.

4. The vinyl acetate based polymer emulsion of claim 3 wherein the reducing agent represented by the formula is selected from the group consisting of: 2-hydroxyphenyl hydroxymethyl sulfinic acid-sodium salt; 4methoxyphenyl hydroxymethyl sulfinic acid-sodium salt; 2-hydroxy-2-sulfinato acetic acid-disodium salt; 2-hydroxy-2-sulfinato acetic acid-zinc salt; 2-hydroxy-2-sulfinato propionate-disodium salt; ethyl 2-hydroxy-2-sulfinato propionate-sodium salt.

5. The vinyl acetate based polymer emulsion of claim 3 wherein the vinyl acetate based polymer emulsion is formed using a redox catalyst system of hydrophobic hydroperoxide and the glycolic acid adduct of sodium sulfite.

6. The vinyl acetate based polymer emulsion of claim 3 wherein M is sodium or zinc.

7. The vinyl acetate based polymer emulsion of claim 3 wherein $R_1$ is OH.

* * * * *